United States Patent [19]

Brockway

[11] 4,290,793
[45] Sep. 22, 1981

[54] FLUID BED CHEMICAL STRENGTHENING OF GLASS OBJECTS

[75] Inventor: M. Clifford Brockway, Columbus, Ohio

[73] Assignee: Liberty Glass Company, Sapulpa, Okla.

[21] Appl. No.: 967,567

[22] Filed: Dec. 8, 1978

[51] Int. Cl.³ .................. C03B 25/06; C03B 25/10; C03B 27/00

[52] U.S. Cl. .................. 65/30.14; 65/30.1; 65/114; 65/117; 65/118

[58] Field of Search .................. 65/30 R, 30 E, 114, 65/117, 118; 165/104 F

[56] References Cited

U.S. PATENT DOCUMENTS

| | | | |
|---|---|---|---|
| Re. 27,921 | 2/1974 | Duthoit | 65/30 E |
| 3,053,704 | 9/1962 | Munday | 165/104 F |
| 3,281,225 | 10/1966 | Hazdra et al. | 65/30 E |
| 3,348,934 | 10/1967 | Hinson et al. | 65/30 R |
| 3,423,198 | 1/1969 | McMaster et al. | 65/111 |
| 3,473,906 | 10/1969 | Graham | 65/30 E |
| 3,498,773 | 3/1970 | Grubb et al. | 65/30 E |
| 3,508,895 | 4/1970 | Poole et al. | 65/30 E |
| 3,607,172 | 9/1971 | Poole et al. | 65/30 E |
| 3,743,491 | 7/1972 | Poole et al. | 65/30 E |
| 4,050,407 | 9/1977 | Garwood et al. | 65/60 B |
| 4,111,675 | 9/1978 | Ballard | 65/114 |

FOREIGN PATENT DOCUMENTS 1383495 2/1975 United Kingdom .
1384936 2/1975 United Kingdom .
1386784 3/1975 United Kingdom .............. 65/30 E

OTHER PUBLICATIONS

Elmer et al., "Nitrided Glasses", presented at the Seventh International Congress on Glass, Brussels, Jul. 1965, Communication 30/1.3.1.

Primary Examiner—Richard V. Fisher
Attorney, Agent, or Firm—Senniger, Powers, Leavitt and Roedel

[57] ABSTRACT

A process for strengthening a glass object by chemical reaction at the glass surface of the object between the glass and a chemical strengthening agent reactive with the glass to alter its composition and thereby either directly generate compressive stress therein or reduce the thermal expansion coefficient thereof. The object is kinetically contacted with the chemical strengthening agent in a bed comprising gas-fluidized particulate solid material under conditions of temperature and active fluidization such that the reaction proceeds but the formation of either stress-concentrating surface defects or an adherent coating of solid material on the surface of the object is substantially avoided. The object is maintained in the bed for a time sufficient for the reaction to alter the composition of a marginal stratum of the object adjacent the surface. The object is thereafter cooled, producing an object of increased strength and toughness having the marginal stratum under compressive stress.

14 Claims, 4 Drawing Figures

FLUID BED CHEMICAL STRENGTHENING OF GLASS OBJECTS

BACKGROUND OF THE INVENTION

This invention relates to the chemical treatment of glass and more particularly to a novel method for the chemical strengthening of glass articles such as bottles or rods by chemical reaction in a fluid bed.

A variety of techniques are known to the art whereby glass products are subjected to chemical treatment. An important function served by certain treatment processes is improvement of the mechanical strength of a glass object by a chemical modification which produces or induces compressive stress in a stratum or zone of the glass object adjacent the surface. One chemical treatment method which has been subjected to extensive research and development effort is ion exchange, the reaction technique in which the desired zone of compressive stress is provided by exchanging the principal alkali cations of the glass for cations having a different ionic diameter. Where the cations of the exchange medium are larger than the principal alkali ions of the glass, the process is often referred to as "ion stuffing" since compression directly ensues from occupation by the larger cations of the space vacated by the smaller cations of the glass. Ion stuffing must be performed under time and temperature conditions such that the stuffing induced compressive stress is not lost by thermally induced stress relaxation. Where cations of the exchange medium are smaller than the principal alkali ions of the glass, an ion-exchanged layer is produced which has a lower thermal coefficient of expansion than the main body of the glass. On cooling, the relatively greater contraction of the main body places the chemically treated layer under compression. In either type of exchange, the compressively stressed stratum imparts substantially improved strength to the glass object as a whole. Typically, bottles or other articles constituted by soda/lime glass are strengthened by exchange with an ion exchange medium comprising a potassium or lithium salt. Other exchange media include rubidium, cesium, silver or copper as the exchange ion.

Strengthening by ion exchange or other chemical treatment offers particular advantages in the manufacture of bottles for carbonated beverages. Such bottles are routinely exposed to internal pressures in a range of about 50 psig. When such a bottle is broken, the resulting fragments can be propelled at high velocity by the carbon dioxide which is released. Occasionally a beverage bottle explodes due to the force of internal pressure alone. Chemical strengthening of beverage bottles affords the potential advantage of reducing the incidence of breakage from either overpressure or percussion, and thus contributes materially to the safety of those who use or handle these bottles. An additional advantage of strengthening beverage bottles is the ability to reduce container weight, with associated cost reductions.

Prior to the present invention, however, commercial application of ion exchange or other chemical strengthening processes has been very limited due to the practical drawbacks associated with most previously known processes. Thus, the vast majority of known processes for ion exchange have involved immersion of glass objects in a molten salt bath containing ions that are exchanged with ions of the glass. The problems which may arise from incorporation of a molten salt bath dipping operation into a process for the high volume production of a low cost commodity such as glass bottles, are apparent. Moreover, aside from the difficulty and expense attendant a molten salt dipping operation as such, the bottles leaving the dipping bath bear a coating of frozen salt which must be removed before the bottles can be packaged or further processed. This is a particular problem where the bottles are to be subsequently dipped in a plastic coating bath to provide a plastic containment coating of the type that is desirable or necessary in the light weight nonreturnable bottles for which ion exchange strengthening is particularly desirable.

Although other methods have been devised in the art which avoid some of the more severe conditions necessitated by dipping in molten salt, essentially all prior art processes result in the formation of a salt residue on the bottle surface which must be washed off after the strengthening operation is complete. This result almost unavoidably follows from the basic approach of the prior art wherein a static coating is provided on the bottle surface so as to afford the time and area of contact considered necessary to carry out the chemical strengthening reaction. In fact, most of the prior art ion exchange processes have required that the exchange salt be ultimately brought to a molten state for carrying out the ion exchange reaction.

Thus, for example, a number of U.S. patents including Poole et al. U.S. Pat. No. 3,508,895, Graham U.S. Pat. No. 3,473,906, Grubb et al. U.S. Pat. No. 3,498,773, Poole et al. U.S. Pat. No. 3,607,172, and Poole et al. U.S. Pat. No. 3,743,491 disclose processes in which a coating of ion exchange salt is provided by spraying bottles with an aqueous solution of the salt. Subsequent to application of this coating the bottles are heated to a temperature at which the salt is molten and ion exchange proceeds. In a further improved process described in British Pat. No. 1,384,936 solid particulate ionic material is applied by an electrostatic process, after which the bottle or other glass object is heated to a temperature at which ion exchange takes place with a molten salt. Although superior in a number of important respects to the molten dipping and aqueous spray processes, the method of the British patent nonetheless leaves a residue which must be washed off before the ion exchange strengthened bottle can be plastic coated or packaged for sale.

SUMMARY OF THE INVENTION

Among the several objects of the present invention, therefore, are the provision of a novel and advantageous process for the chemical strengthening of glass objects; the provision of such a process which is adapted not only for ion exchange reactions but other chemical treatment reactions for strengthening the glass object; the provision of such a process which avoids the need for removal of reaction products and residual chemical strengthening agent from the surface of the glass object; the provision of such a process which can be carried out at relatively high speed, volume, and efficiency; the provision of such a process which can be carried out on a continuous basis and practically integrated into the operation of a conventional bottle manufacturing operation; the provision of such a process which does not require a static coating of chemical strengthening material on the surface of the glass object for carrying out chemical treatment; the provision of a process adapted for minimum pollution and high energy efficiency; and the provision of apparatus adapted for use in carrying out the process.

Briefly, therefore, the present invention is directed to a process for strengthening a glass object by chemical reaction at the glass surface of the object between the glass and a chemical strengthening agent reactive with the glass to alter its composition and thereby either directly generate compressive stress therein or reduce the thermal expansion coefficient thereof. In the process, the object is kinetically contacted with the strengthening agent in a bed comprising gas-fluidized particulate solid material under conditions of temperature and active fluidization such that the reaction proceeds but the formation of an adherent coating of solid material on the surface of the object is substantially avoided. The object is maintained in the bed for a time sufficient for the reaction to alter the composition of a marginal stratum of the object adjacent the surface. Thereafter the object is cooled, producing an object of increased strength and toughness having said marginal stratum under compressive stress.

The invention is further directed to apparatus for fluid bed chemical treatment of glass objects. The apparatus comprises a vessel defining a fluidized bed zone. The vessel has gas inlet means below the zone for introduction of fluidizing gas. A gas distribution means is located in the vessel between the inlet means and the fluidized bed zone for delivery of fluidizing gas from the inlet to the zone at a vertical velocity that is substantially evenly distributed horizontally of the zone and sufficient to fluidize a bed of particulate solids therein. Gas collection and exit means are located above the zone. On one side of the vessel in solids inlet means for introduction of particulate solids into the zone. A solids discharge means is located horizontally across the bed from the solids inlet means at a level sufficiently below the solids inlet means so as to create a fluid head differential sufficient to cause net flow of the bed horizontally from the solids inlet means to the solid outlet means. The apparatus further includes means for conveying bottles in a horizontal direction through the fluidized bed zone.

DESCRIPTION OF THE PREFERRED EMBODIMENTS

Figure 1:
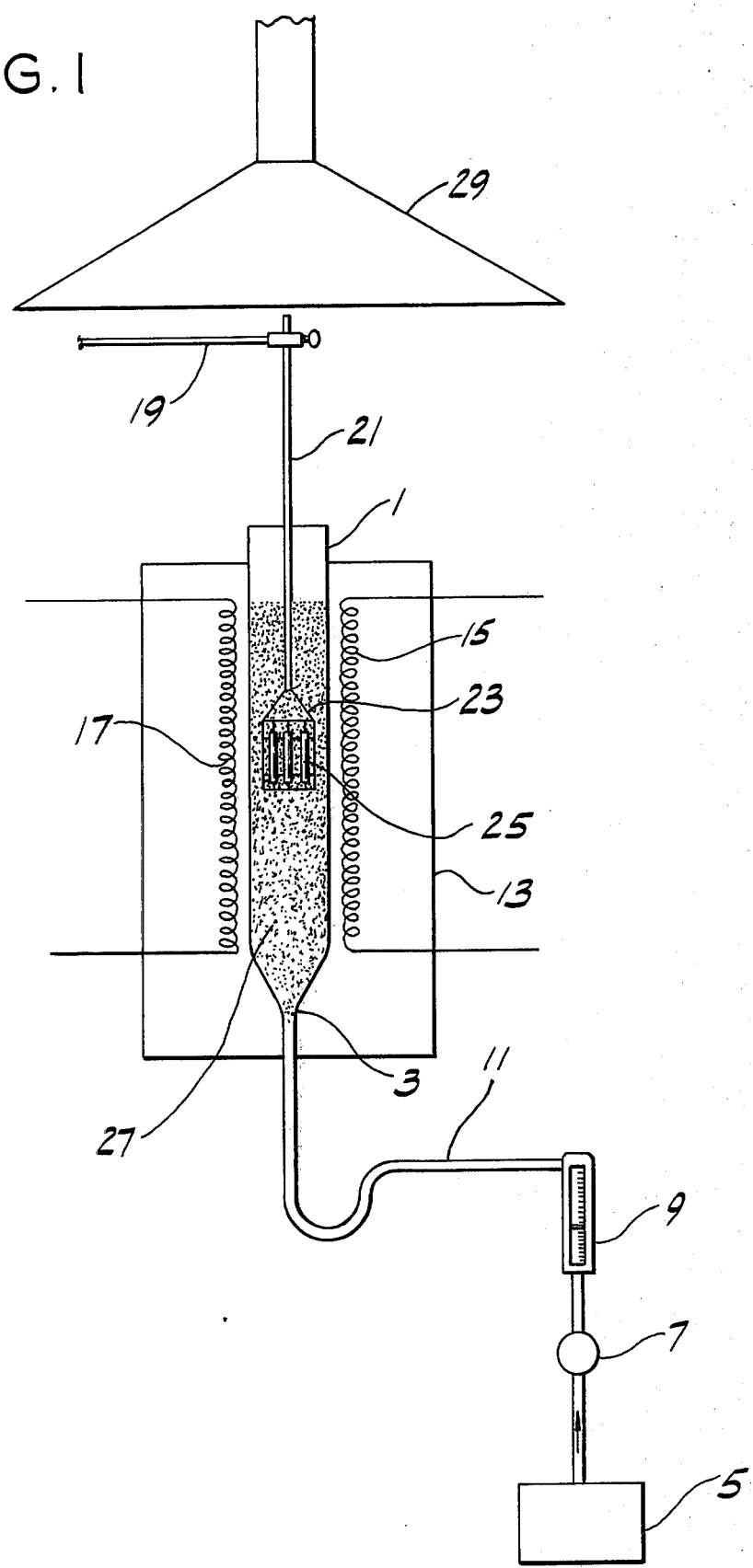
FIG. 1 is a schematic drawing of an apparatus in which fluidized bed chemical strengthening of glass rods has been demonstrated.

In accordance with the present invention a novel fluidized bed process has been discovered, by which a variety of chemical reactions between the surface of glass objects and chemical strengthening agents can be carried out in a new and advantageous manner. This invention affords the means for carrying out chemical strengthening reactions on a convenient, economical, high volume industrial scale, while avoiding the drawbacks that have limited the applicability of most of the various chemical strengthening methods heretofore known to the art.

In a distinct departure from the teachings of the prior art, it has now been discovered that chemical strengthening reactions can be carried out with a solid phase strengthening agent that is not applied as a static coating on the glass object preparatory to effecting the strengthening reaction. In particular, it has been found that the kinetic contact between solid glass and solid strengthening agents, which prevails in a fluidized bed system, is sufficient to permit the chemical transfers between the fluidized solid particles and the glass that constitute the strengthening reaction. Not only is fluid bed treatment thus a highly convenient and advantageous method for effecting the necessary chemical transfer, but it has further been discovered that, by proper control of temperature and by maintaining active fluidization, adherence of the solid particles to the glass surface can be substantially avoided, thereby obviating the need for subsequent washing operations to remove residual reaction agent or products of reaction.

In an alternative embodiment of the invention, the chemical strengthening agent can be comprised of the fluidizing gas. Although gas/solid strengthening reactions have been known to the art, they typically generate reactions products which must subsequently be removed, just as in the case of solid or liquid strengthening agents. However, by carrying out the gas/solid strengthening reaction in a fluid bed system, inert or coreactive bed solids are effective both for heat transfer purposes and, more particularly, for impingement on the glass bottle surface to scour and remove reaction products therefrom, thus again obviating the need for subsequent washing operations before further processing or packaging for sale.

Each of the various chemical treatments for strengthening of glass objects operates through the creaction of compressive stress in a marginal stratum adjacent the glass surface. In certain of these reactions, stress is developed immediately upon chemical modification of the glass in the stratum, while in others the reaction is operative to reduce the coefficient of thermal expansion of the glass, thus inducing compressive stress on subsequent cooling of the object. Chemical strengthening is of particular benefit in the case of bottles, especially beverage bottles, but in applicable to other glass objects such as rods and other solid, hollow or porous configurations.

As noted hereinabove, one of the principal chemical strengthening reactions is ion exchange. In ion stuffing, where stress is directly produced, soda/lime glass, for example, is effectively treated with a potassium salt such as potassium carbonate, monobasic potassium phosphate, dibasic potassium phosphate and tripotassium phosphate. In small for large ion exchange, compressive stress is not directly developed but the thermal coefficient of expansion of the glass is reduced. In the case of soda/lime glass, small for large ion exchange is carried out with a lithium salt, which may conveniently be lithium metasilicate, lithium orthosilicate or any of the lithium analogs of the various potassium salts listed above.

In a particularly advantageous embodiment of the invention, it has been discovered that a glass material may itself serve as the ion exchange medium for carrying out ion exchange strengthening. Thus, for example, strengthening has been carried out using a fluidized bed comprising potassium silicate glass as the exchange medium.

Another reaction which is effective for introducing compressive stress and strengthening glass objects is nitriding, wherein some of the glass network oxygen in silica glass is replaced with nitrogen. This reaction not only produces compressive stress, but also increases the annealing point, thus reducing the extent to which relaxation can occur at the temperatures to which the object is exposed during reaction and prior to cooling. Furthermore, the increase in annealing point attained by nitriding also leads to surface compression when the glass object is annealed and cooled because the nitrided marginal stratum or "skin" will "set" prior to the interior portion of the object. With silica glass, nitriding may be carried out by reaction with ammonia, which also serves as the fluidizing gas for a bed of coreactive or inert solids. Alternatively, the glass may be treated in a fluidized bed comprising boron nitride, which is demonstrably effective for increasing the strength of glass, though the exact mechanism of the boron nitride reaction is not presently known. It is believed that at least some of the reaction with silica glass is a nitriding reaction which may be represented by the following equation:

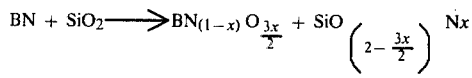
$$BN + SiO_2 \longrightarrow BN_{(1-x)}O_{\frac{3x}{2}} + SiO_{\left(2-\frac{3x}{2}\right)}N_x$$

where x is a fraction corresponding to the extent of reaction.

Another possibility, however, is that the boron nitride powder reacts at its surface to form $B_2O_3$ and the latter material reacts with the glass to yield a surface stratum enriched in $B_2O_3$. Addition of $B_2O_3$ would be expected to lower the thermal expansion coefficient and thus lead to residual compressive stress upon cooling to room temperature.

Another reaction which occurs between the fluidizing gas and a glass object is the dealkalinization of a sodium or other alkali glass by reaction with $SO_2$. The product of this reaction is an alkali metal sulfate which tends to form a visible "bloom" in conventional alkali glass/$SO_2$ reaction processes. In the process of the invention, however, this "bloom" is continuously removed by the scouring effect of the fluidized solid particulate material.

In carrying out the process of the invention, the product that is to be treated is immersed in or passed through the bed of gas-fluidized particulate solid so that particles of the solid are in continual kinetic contact with the surface of the object. In order for the treatment reaction to proceed, the gas/solid system must be heated to an elevated temperature. Heating can be effected either by preheating of the fluidized gas or by contact heaters (wall, base, or immersion type) in the bed, or both. In a glass bottle manufacturing line, waste heat from a melting furnace may be advantagiously utilized to preheat fluidizing gas, with consequent savings in energy consumption.

In accordance with the invention, it has surprisingly been discovered that reaction in the fluid bed proceeds at temperatures which are not only low enough so that nongaseous reactants remain in the solid state, but which are also low enough relative to the softening temperatures of the glass and solid reactants so that the formation of an adherent coating of the solid material on the surface of the glass object is substantially avoided. Moreover, as a result of the repetitive momentary or instantaneous bombardment of the surface in the fluid bed, effective chemical reaction and consequent mechanical strengthening are achieved without formation of any static coating.

Generally, it has been found that the reaction proceeds satisfactorily without formation of an adherent coating where it is conducted at a temperature between about the strain point of the glass and about 100° F. above the annealing point. In an ion exchange reaction, the temperature is preferably maintained in the range of about 950°–1000° F., with treatment at approximately 985° F. for 15 to 20 minutes being considered optimum for exchange between a soda/lime glass and a potassium ion exchange material. Where the chemical strengthening agent may tend to cause stress-inducing defects to form in the glass surface, the temperature should be controlled to minimize or eliminate this result. Thus, for example, lithium metasilicate may tend to etch the glass at temperatures of about 1000° F. or above, causing surface defects at which stresses can concentrate and lead to a reduction in service strength. However, by maintaining the treatment temperature at about 985° F., effective ion exchange is accomplished without creating stress-concentrating defects that negate the improvement in service strength realized by provision of a compressively stressed outer stratum.

In order to completely avoid adherence of any particulate solid material to the surface of the glass, it is necessary to maintain conditions of active fluidization over the entire surface of the glass and to prevent the formation of hot spots where the glass may soften and collect solid material. From the standpoint of operational efficiency, it is also important to avoid collection of solids on the hot surfaces of wall or immersion heaters. Minimization of the hot spots is effected by conventional engineering methods for minimizing temperature gradients throughout the bed. Collection on the hot surfaces of contact heaters can be eliminated by various techniques including, for example, fluidizing the bed with preheated air and controlling the bed temperature by regulating the heat input into the air preheater; providing dual zone control of fluidizing gas so that the intensity of fluidization adjacent the heater surfaces is greater than in the balance of the bed; streamlining the geometry of the bed and heater configurations; and utilizing a high melting point diluent such as aluminum oxide in the bed. Reactive diluents such as potassium orthophosphate, orthoclase and potassium carbonate may also be used. Use of a diluent inhibits particle agglomeration at hot surfaces even where sharp local temperature gradients cannot be avoided and sticking problems would otherwise occur.

Active fluidization is achieved where gas velocity is fairly evenly distributed over the cross section of the bed. This condition promotes relative movement between the fluidized particulate solids and the glass object sufficient to avoid any "dead spots" on which solids might otherwise collect. Where a reasonably uniform distribution of velocity is maintained, it has been found that solids collection is largely avoided even in such potentially difficult areas as the concave surface on the bottom of a beverage bottle. Elimination of dead spots, and the maintenance of active fluidization, is facilitated by tilting a beverage bottle so that there is a vertical component to velocity tangential to the bottom. Rotation of the bottle at moderate velocity, e.g. 5–15 rpm, further contributes to elimination of dead spots.

After the glass object has been held in the bed for a time sufficient for the reaction to alter the composition of the glass in a marginal stratum adjacent the surface, the object is cooled. Cooling conditions are not generally critical, though in the case of reactions such as large for small ion exchange it is desirable to carry out cooling at a relatively rapid rate, sufficient to minimize any relaxation of the compressive stress that has been created in the reaction. For ion exchange strengthening generally, it has been discovered that the regions of the glass object apart from the aforesaid marginal stratum can be annealed simultaneously with the strengthening reaction. Thus, if the reaction is carried out in the temperature range referred to above, most preferably in the 950°–1000° F. range for 15 to 20 minutes, the conditions effect annealing in conventional soda/lime glass objects. Optimally, for glass objects of such composition, simultaneous reaction and annealing are carried out at approximately 985° F. for about 15 minutes. The glass article is preferably cooled at a rate of at least about 10° to 13° F. per minute in order to minimize relaxation during cooling.

The process conditions can be varied somewhat depending on the nature of glass and the strengthening agent.

Particle size of the solid material comprising the fluidized bed typically ranges minus 50/plus 150 mesh. In order to minimize elutriation while providing high effective surface area for reaction, the preferred range is on the order of minus 70/plus 100 mesh. In the case of boron nitride, satisfactory results have been demonstrated with a particle size range of minus 40/plus 150 mesh. Where the only reactant is in the gas phase, the primary criterion is avoidance of elutriation while providing good fluidizing action, which may typically be achieved with silica in the minus 50/plus 100 mesh range.

Specification of superficial gas velocity is also governed by the competing objectives of maintaining active powder fluidization while avoiding extensive elutriation. Thus, for a given system the desired gas velocity can be readily determined by straightforward conventional experimentation. Typically a superficial velocity in the range of 200 to 900 SCF/ft$^2$ per hour is appropriate. However, where the principal reactant is in the gaseous phase, it is desirable to maintain gas velocity near the minimum for active powder fluidization in order to maximize the dwell time of the gaseous reactant in the bed.

There is no criticality to the dimensions of the bed, and the bed height for solid strengthening agents can be only a few inches greater than the maximum height of the glass objects being treated if the fluidizing gas is preheated prior to introduction into the bed. If the bed is heated entirely by wall or immersion heaters, the bed depth must be increased to that necessary to achieve the desired temperature level and uniformity in the portion of the bed where treating reactions are carried out. Even in such instances, however, it is generally necessary for the bed depth to exceed the height of treated glass objects by only six to eight inches. The width and length of the bed need only to be sufficient to ensure active fluidization while providing adequate space to permit the desired mode of immersion of objects having the dimensions of those to be treated. As further discussed hereinbelow, where the strengthening agent is solid, the process of the invention may be conducted on a continuous basis with multiple rows of objects being carried horizontally through the bed on overhead conveying devices. In such event the width of the bed is dictated by the productive capacity desired, while the length of the bed is computed from the desired rate of travel therethrough, the temperature of the bed, and the time/temperature relationships for the particular reaction involved. Where the strengthening reactant is gaseous, it may be more desirable to provide for vertical travel through the bed countercurrent to the flow of gas. Bed dimensions would be modified accordingly.

After the treated glass objects are removed from the fluid bed, the surfaces of the objects are substantially devoid of any adherent coating of either bed solids or products of reaction. However, the objects may carry a slight dust of very lightly adhering particles which are readily removed by impingement of an air stream or jet on the surfaces of the bottles after they are removed from the bed. As noted, this advantageous capability of the process of the invention obviates the need for washing the glass objects to remove residual solids. As a consequence, no salt contaminated aqueous effluents are generated; and there is no need for the investment, operations expense and energy consumption to separate water from salt (as by evaporation and drying) that is required in conventional processes to avoid pollution and loss of material. Moreover, it is believed that, when the fluid bed solids become contaminated with reaction products, the resultant spent solids may, at least in some instances such as mixed potassium and sodium silicates, be suitable for other uses and thus saleable to the trade.

The following examples illustrate the invention:

EXAMPLE 1

Demonstration of the process of the invention was carried out in the apparatus shown in FIG. 1. At 1 in the drawing is a cylindrical reaction vessel having a gas inlet 3 at the bottom thereof which receives fluidizing gas from a source 5, through a pressure regulator 7, a flow meter 9, and a gas delivery pipe 11. Vessel 1 is contained in an electric furnace 13 where it may be heated by elements 15 and 17. Suspended from a support 19 through a rod 21 is a wire holder 23 centrally located of the interior of vessel 1. Carried by wire holder 23 are a plurality of glass objects 25 which may typically be glass rods. Also contained within vessel 1 is a bed of solid particulate material 27.

In FIG. 1, bed 27 is illustrated in the expanded state as provided by admission of dry compressed air from source 5 through regulator 7, flow meter 9, delivery pipe 11 and gas inlet 3 into the bottom of vessel 1. The gas velocity is controlled so as to expand bed 27, without excessive elutriation, by throttling at regulator 7 to provide the desired gas flow as indicated on meter 9. Those particles which may be unavoidably entrained out the top of the vessel 1 are removed by the draft provided at a hood 29.

Using the apparatus of FIG. 1, 5 mm. diameter glass rods composed of R-6 Kimble soda/lime glass, with a reported annealing point of 525° C. and a reported strain point of 486° C., were subjected to treatment in air-fluidized particulate solid media. Each rod was treated in either silica sand, potassium feldspar, potassium carbonate, potassium silicate or tetrapotassium phosphate. In each case, the fluidized powder was maintained at a temperature of approximately 985° F. and fluidized with air at a superficial velocity of approximately 1600–3000 cc/in² per minute. After removal from the bed, seven of the rods which had been treated with feldspar and five of the rods which had been treated with potassium silicate were placed in an annealing oven at 850° F. and held until the last specimen had been exposed for 15 minutes. The oven was then turned off and the rods cooled at the natural cooling rate of the oven. All of the rods exposed to silica sand, tetrapotassium phosphate and potassium carbonate, and nine of the rods exposed to potassium silicate were cooled by simply allowing them to stand in static room temperature air.

After the treated rods had been cooled, their strength was determined by subjecting them to a three point bed strength test utilizing an Instron tester at a head speed of 0.02 inches per minute. The specimens were loaded at three points. The span between the two lower points was 1.5 inches, and the top point was located halfway between the bottom points longitudinally of the rod. The rods were progressively loaded until failure, and strength was calculated in accordance with the formula for modulus of rupture for solid cylinders:

$$M_r = (8PL_3/D)$$

Where
$M_r$ = Modulus of rupture (psi)
$P$ = load (lbs)
$L$ = span (in)
$D$ = diameter of rod at Break (in)

To provide a basis for comparison, the three point bend strength test was also carried out on a number of rods which were untreated, and on several additional rods which were heated in an oven at 985° F. for 15 minutes and then cooled in room temperature air, but not exposed to fluidized bed treatment. Set forth in Table 1 are the treatment conditions and the results of the three point bend strength test for both the treated and untreated rods.

TABLE 1
DATA ON EXPLORATORY USE OF FLUIDIZED POWDER TO STRENGTHEN GLASS RODS[1]

| Table Entry Line No. | Fluidized Powder Employed | Temperature of Fluidized Powder | Oven Preheat of Rods F. | Oven Preheat of Rods min. | Time Rods Were Immersed In Fluidized Powder, min. | Post-Treatment Cooling Cycle | Number of Rods Tested | 3-Point Bend Strength of Rods, psi | Percent Strength Increase Compared to As-Received Untreated Rods |
|---|---|---|---|---|---|---|---|---|---|
| 1 | none | — | — | — | — | — | 10 | 23,000 | — |
| 2 | none | — | 985 | 15 | — | Cooled in lab air | 5 | 22,500 | — |
| 3 | Silica Sand | 985 F. | 985 | 15 | 15 | Cooled in lab air | 6 | 24,900 | 8 |
| 4 | Potassium feldspar[2] | 985 F. | 850 | 15 | 15 | Cooled in oven from 850 F. | 7 | 24,300 | 6 |
| 5 | Potassium carbonate | 985 F. | 985 | 15 | 15 | Cooled in lab air | 6 | 26,200 | 14 |
| 6 | Potassium silicate | 985 F. | 985 | 15 | 15 | Cooled in lab air | 9 | 27,000 | 17 |
| 7 | Potassium silicate | 985 F. | — | — | 15 | Cooled with oven from 850 F. | 5 | 33,200 | 44 |
| 8 | Tetra potassium phosphate | 985 F. | 985 | 15 | 15 | Cooled in lab air | 6 | 31,000 | 35 |

[1] All rods were nominally 5 mm (0.197 inch) diameter, composition R-6 Kimble soda-lime glass.
[2] Feldspar K40 from Feldspar Corp. having $K_2O$ content of 13 percent.

Utilizing the same basic procedure as that described above, additional Kimble R-6 soda/lime glass rods were subjected to treatment in either air-fluidized boron nitride, air-fluidized lithium metasilicate or in a bed of silica sand fluidized with air containing 0.5 volume percent sulfur dioxide. The rods so treated were subjected to the three point bend strength test, along with a number of untreated control samples. Preheating conditions, powder bed conditions, time of immersion in the fluidized bed, and three point bend strength test results for these rods are set forth in Table 2.

TABLE 2
DATA ON EXPLORATORY TREATMENTS OF GLASS RODS[a] IN FLUIDIZED POWDERS

| Table Entry Line No. | Rod Preheating Oven Temp, C. | Rod Preheating Time In Oven, min | Fluidized Powder Employed Sizing | Fluidized Powder Employed Type | Temperature C. | Temperature F. | Fluidizing Gas | Time of Rod[b] Immersion in Fluidized Bed, min |
|---|---|---|---|---|---|---|---|---|
| 1 | | | | Untreated control-rod samples | | | | |
| 2 | | | | Untreated control-rod samples | | | | |
| 3 | 540 | 15 | −40+150 mesh | Boron Nitride | 540 | 1000 | Air | 10 |
| 4 | 540 | 15 | −40+150 mesh | Boron Nitride | 540 | 1000 | Air | 20 |
| 5 | 540 | 15+ | −40+150 mesh | Boron Nitride | 540 | 1000 | Air | 40 |
| 6 | 540 | 15+ | −40+150 mesh | Boron Nitride | 540 | 1000 | Air | 80 |
| 7 | 500 | 15+ | −100+150 mesh | Sand | 500 | 1000 | Air + 0.5% $SO_2$ | 30 |
| 8 | 500 | 15+ | −100+150 mesh | Sand | 500 | 1000 | Air + 0.5% $SO_2$ | 60 |
| 9 | 540 | 15 | −30+200 mesh | Lithium Metasilicate | 540 | 1000 | Air | 5[c] |
| 10 | 540 | 15 | −30+200 mesh | Lithium Metasilicate | 540 | 1000 | Air | 10 |
| 11 | 540 | 15 | −30+200 mesh | Lithium Metasilicate | 540 | 1000 | Air | 15 |
| 12 | 540 | 15 | −30+200 mesh | Lithium Metasilicate | 540 | 1000 | Air | 30 |
| 13 | 530 | 15 | −30+200 mesh | Lithium Metasilicate | 530 | 985 | Air | 5 |
| 15 | 525 | 15 | −30+200 mesh | Lithium Metasilicate | 525 | 977 | Air | 5 |
| 16 | 520 | 15 | −30+200 mesh | Lithium Metasilicate | 520 | 968 | Air | 5 |
| 17 | 515 | 15 | −30+200 mesh | Lithium Metasilicate | 515 | 959 | Air | 5 |
| 18 | 510 | 15 | −30+200 mesh | Lithium Metasilicate | 510 | 950 | Air | 5 |

Average Strength

TABLE 2-continued
DATA ON EXPLORATORY TREATMENTS OF GLASS RODS[a] IN FLUIDIZED POWDERS

| Table Entry Line No. | No. of Rods Tested | 3-Point Bend Strength, psi | Increases Compared to As-Received Untreated Rods, % |
|---|---|---|---|
| 1 | 6 | 27,400 ⎫ 27,700 | — |
| 2 | 6 | 28,000 ⎭ | — |
| 3 | 5 | 35,900 | 30 |
| 4 | 5 | 30,400 | 10 |
| 5 | 6 | 35,400 | 28 |
| 6 | 6 | 31,000 | 12 |
| 7 | 6 | 35,900 | 30 |
| 8 | 6 | 29,200 | 5 |
| 9 | 3 | 22,800 | −18 |
| 10 | 3 | 14,200 | −49 |
| 11 | 3 | 22,500 | −19 |
| 12 | 3 | 18,700 | −32 |
| 13 | 3 | 36,600 | 32 |
| 15 | 6 | 31,100 | 12 |
| 16 | 6 | 34,900 | 26 |
| 17 | 3 | 28,800 | 4 |
| 18 | 3 | 36,500 | 32 |

[a] Rods were nominally 5 mm (0.2 in.) in diameter, composition was R-6 Kimble soda/lime glass with reported annealing point of 525 C. and strain point of 486 C.
[b] Following treatment in the fluidized bed, rods were cooled in ambient laboratory air (unless otherwise noted).
[c] Samples were annealed 15 min at 500 C. after fluidized-bed treatment and before air-cooling.

With the exception of lithium metasilicate treatment at 1000° F., Table 2 shows consistent improvement resulting from treatment in fluidized media that are reactive with glass. The unfavorable results for lithium metasilicate at 1000° F. are believed to be attributable to etching of the glass or another temperature dependent phenomenon that creates stress-concentrating surface defects therein.

After removal from the fluid bed and cooling in accordance with the method described in an Example 1, the potassium silicate treated rods of this example were subjected to a three point bend strength test in the manner described in Example 1. To provide a basis of comparison, 22 untreated control rod samples were also subjected to the three point bend strength test. The operating conditions and bend strength test results of this example are set forth in Table 3.

TABLE 3
DATA ON STRENGTHENING OF GLASS RODS[a] BY EXTENDED TIME TREATMENTS IN FLUIDIZED POTASSIUM SILICATE

| Table Entry Line No. | Rod Preheating Oven Temp, C. | Rod Preheating Time in Oven, min | Fluidized Powder Employed Sizing | Fluidized Powder Employed Type | Powder-Bed Temperature C. | Powder-Bed Temperature F. | Time of Rod[b] Immersion in Fluidized Bed, hr | No. of Rods Tested | 3-Point Bend Strength, psi Max | 3-Point Bend Strength, psi Min | 3-Point Bend Strength, psi Avg | Average Strength Increases Compared to As-Received Untreated Rods, % |
|---|---|---|---|---|---|---|---|---|---|---|---|---|
| 1 | | | Untreated control-rod samples | | | | | 22 | — | — | 25,500 | — |
| 2 | 450 | 15 | −100+150 mesh | Potassium Silicate | 450 | 840 | 4 | 3 | 37,900 | 14,900 | 29,200 | 15 |
| 3 | 450 | 15 | −100+150 mesh | Potassium Silicate | 450 | 840 | 7 | 3 | 37,700 | 34,500 | 36,400 | 43 |
| 4 | 450 | 15 | −100+150 mesh | Potassium Silicate | 450 | 840 | 16 | 3 | 47,100 | 24,100 | 34,400 | 35 |
| 5 | 450 | 15 | −100+150 mesh | Potassium Silicate | 450 | 840 | 65 | 3 | 71,100 | 49,700 | 63,900 | 150 |

[a] Rods were nominally 5 mm (0.2 in.) in diameter, composition was R-6 Kimbel soda/lime glass with reported annealing point of 525 C. and strain point of 486 C.
[b] Following treatment in fluidized bed, rods were cooled in ambient laboratory air.
[c] Data for as-received rods repeated from previous reports.

EXAMPLE 2

Using the apparatus of FIG. 1, additional fluid bed strengthening tests were conducted on glass rods of the type treated in Example 1. In each of the runs of this example, potassium silicate glass powder was used as the chemical strengthening agent. Treatment conditions differed from those of Example 1 in that the reaction temperature was maintained at a relatively low level, i.e. 840° F., while the time of immersion in the fluidized bed was relatively long, varying from 4 to 65 hours. Before introduction into the treatment bed the rods were preheated to treatment temperature by holding them in an 840° F. oven for 15 minutes.

EXAMPLE 3

Utilizng apparatus of the type shown in FIG. 1, fluid bed strengthening was demonstrated for 10 oz. capacity beverage bottles. Each of the bottles was preheated in a bottle preheating oven to a temperature of 510° to 250° C., and then immersed in a bed of fluidized potassium silicate. For certain of the bottles, the fluidized bed was maintained at a temperature of 520° C., while for the remainder the bed was maintained at 530° C. Three of the bottles treated in the fluidized bed at 520° C. were axially rotated at 8 rpm during immersion while the remainder were held in a static condition. In each case, the bottle was immersed for a period of 15 minutes, after which it was removed and allowed to cool in static air.

Burst strength tests were conducted on all of the potassium silicate treated bottles as well as on five control bottles which were not subjected to fluidized potassium silicate ion exchange treatment. The results of these tests are set forth in Table 4.

TABLE 4

DATA ASSESSING THE EFFECT OF FLUIDIZED POTASSIUM SILICATE ON THE BURST STRENGTH OF STYLE 170 10-OUNCE CAPACITY BOTTLES

| Table Entry Line No. | Control Temperature of Bottle Preheating Oven, C. | Fluidized Bed Treatment Information | | | | Location of Fracture Initiation on the Bottle |
|---|---|---|---|---|---|---|
| | | Bed Temperature, C. | Time Bottle was Immersed in the Bed, minutes | Rotation of Bottle During Immersion | Bottle Burst Pressure, psig[a] | |
| 1 | | As-Manufactured Control Bottle | | | 475 | Lower Side |
| 2 | | As-Manufactured Control Bottle | | | 670 | Heel |
| 3 | | As-Manufactured Control Bottle | | | 525 | Lower Side |
| 4 | | As-Manufactured Control Bottle | | | 765 | Heel |
| 5 | | As-Manufactured Control Bottle | | | 410 | Mid-Side |
| | | | | | 569 Average | |
| 6 | 510 | 530 | 15 | None | 665 | Heel |
| 7 | 520 | 530 | 15 | None | 635 | Heel |
| 8 | 520 | 530 | 15 | None | 560 | Heel |
| 9 | 520 | 530 | 15 | None | 565 | Heel |
| | | | | | 606 Average | |
| 10 | 510 | 520 | 15 | None | 600 | Heel |
| 11 | 510 | 520 | 15 | None | 670 | Heel |
| 12 | 510 | 520 | 15 | None | 650 | Heel |
| 13 | 510 | 520 | 15 | None | 640 | Heel |
| 14 | 510 | 520 | 15 | None | 670 | Heel |
| 15 | 510 | 520 | 15 | None | 640 | Heel |
| 16 | 510 | 520 | 15 | None | 685 | Heel |
| 17 | 510 | 520 | 15 | None | 600 | (Neck-Finish) |
| | | | | | 644 Average | |
| 18 | 520 | 520 | 15 | 8 rpm | 730 | Mid-Side |
| 19 | 520 | 520 | 15 | 8 rpm | 580 | Heel |
| 20 | 520 | 520 | 15 | 8 rpm | 665 | Heel |
| | | | | | 658 Average | |

[a]Burst strengths were obtained by continuous rather than incremental pressure loading using a rate of 12.5 seconds per 100 psi increment. Thus these strength values are somewhat higher than for an ASTM load duration of 1 minute. Also, these bottles were stored over several years time. Data have been reported which indicate strength increase with storage time. Such strengthening was attributed to "blunting" of production defects by exposure to storage atmospheric moisture.

Because of the relatively small diameter of the fluid bed apparatus in which most of the bottles were treated, a relatively stagnant zone developed underneath the bottle heels and the extent of ion exchange strengthening at that location was not as great as that achieved on the bottle sidewall. As a consequence, most of the treated bottles failed in the heel. Despite this limitation on the degree of strengthening at the heel, the results in Table 4 establish that substantial strengthening was achieved for the treated bottles as compared to the untreated control samples. From the data it can be seen that the extent of strengthening in the sidewall generally exceeded that achieved in the bottle as a whole. Moreover, in the three instances where the bottle was rotated during fluid bed ion exchange treatment, significant strengthening was also realized in the heel and the overall improvement in strength as compared to untreated control bottles was approximately 16%.

EXAMPLE 4

Figure 2:
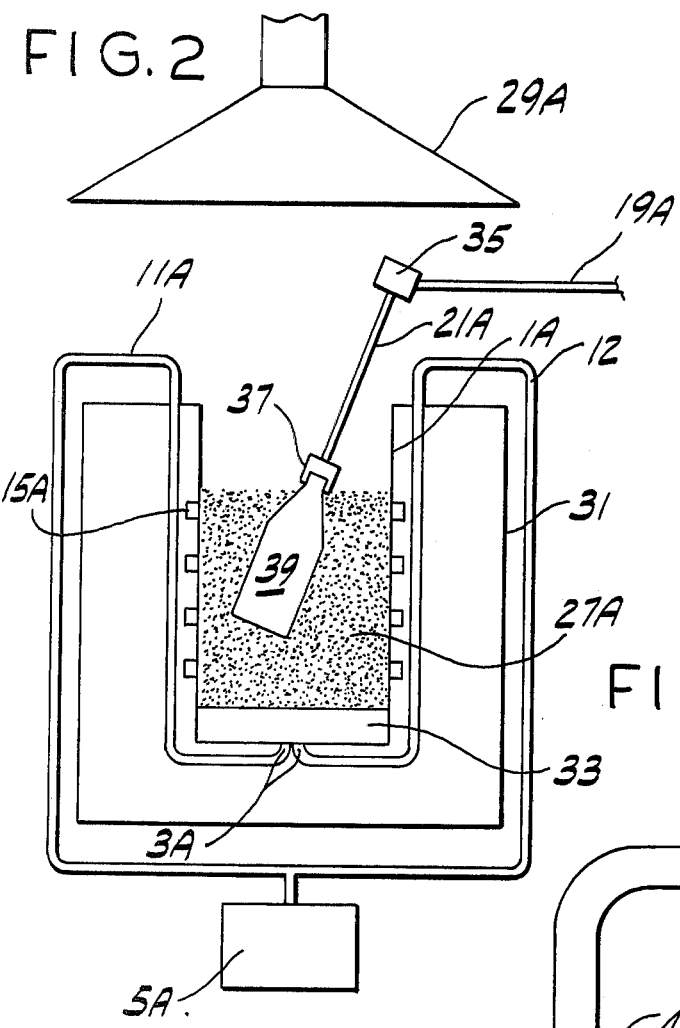
FIG. 2 is a schematic drawing of an apparatus in which fluidized bed chemical strengthening of glass bottles has been demonstrated.

Fluidized bed strengthening of 32 oz. glass bottles was demonstrated in the apparatus shown in FIG. 2. At 1A in FIG. 2 is a 10×10 in. square cross section metal vessel or retort contained within an insulating jacket 31. Located at the bottom center of retort 1A is a gas inlet 3A which receives fluidizing gas from a source 5A through a flow measurement and control apparatus (comparable to those shown in FIG. 1) and gas delivery pipes 11A and 12. Located within retort 1A directly above inlet 3A is a diffusion plate 33. Heating for the system is provided by a heating element 15A which surrounds retort 1A. Suspended from a support 19A is a motor 35. Coupled to the motor shaft is a rod 21A, and on the end of the rod is a chuck 37 noncentrally located of the interior of retort 1A. Carried by chuck 37 is a glass beverage bottle 39. Also contained within retort 1A is a bed of solid particulate material 27A.

Bed 27A is illustrated in the expanded state, as effected by admission of dry compressed air from source 5A through delivery pipes 11A and 12, gas inlet 3A, and diffusion plate 33 into retort 1A. As in the case of apparatus of FIG. 1, the velocity is controlled so as to expand bed 27A without excessive elutriation by throttling at a regulator (not shown). Those particles which may be unavoidably entrained out the top of retort 1A are removed by the draft provided at a hood 29A.

Unannealed sample 32 oz. beverage bottles were utilized in the test demonstrations of this example. Certain of the bottles were thermally treated (e.g. annealed) in inert fluidized media while other bottles were subjected to chemical strengthening treatment and annealed in ion exchange fluidized media. Those bottles treated in the inert media were preheated in a hot air oven to approximately 915° F., a temperature well below the annealing point but sufficient to prevent thermal breakage when the bottles were subsequently immersed in hot fluidized 150 mesh aluminum oxide powder at approximately 985° F. for 15 minutes. The purpose of this treatment in the inert fluidized media was to assess the degree of annealing possible in 15 minutes at the preferred ion exchange temperature of 985° F. A further purpose of treatment in the inert system was to provide control samples which exhibited solely thermal effects of treatment, and with which the strength of the bottles treated in exchange media could thus be fairly compared. Bottles which were used for treatment by ion exchange were preheated in a static radiant furnace at 950° F. for 15 minutes, then immersed in a hot fluidized mixture of potassium silicate and aluminum oxide. Here also, treatment was carried out at a temperature of approximately 985° F. for 15 minutes. By selection of these conditions, it was sought to both anneal the bottles and strengthen them by ion exchange. All bottles, both those treated in the inert media and those subjected to chemical strengthening, were rotated by motor 35 at a speed of about 7 rpm. Fluidizing air was passed through the beds at 175 SCFH.

Aluminum oxide was incorporated in the potassium silicate ion exchange medium for the purpose of eliminating agglomeration of solid particulate material on local hot spots on the wall heater surfaces. One set of five bottles was treated in potassium silicate powder, diluted with approximately 30 volume percent aluminum oxide, at 965° F. for 15 minutes. Another set of four bottles was treated in potassium silicate powder diluted with approximately 40% by volume aluminum oxide, which permitted operation at 975° F. Again treatment was carried out for 15 minutes.

After treatment in the fluidized bed, both those bottles which were subjected to ion exchange treatment and those treated in inert $Al_2O_3$ were cooled in a static air insulated chamber.

Burst tests were conducted to provide a comparison between the strength of those bottles which were treated by ion exchange with those which were thermally treated in inert fluidized media. To provide a further basis for comparison, additional burst tests were conducted on 32 oz. bottles which received no fluid bed treatment of any kind. Each of these latter control bottles received a hot end coating of a tin compound and a cold end polyethylene lubricity spray. Ten of them were then provided with a plastic containment coating of a type described in the U.S. Pat. No. 4,098,934. All of the bottles which had been exposed to fluid bed treatment, both in inert and ion exchange media, were provided with a plastic containment coating of the aforesaid type.

Set forth in Table 5 are the burst test results for the control sample bottles which were not exposed to any form of fluidized bed treatment. Table 6 sets forth the burst strength data for the bottles which were treated in fluidized media.

TABLE 5

| BURST STRENGTHS OF STYLE 198 32 OZ. PRODUCTION "CONTROL" BOTTLES[a] | | | |
|---|---|---|---|
| Table Entry Line No. | Plastic Containment Coating Applied to the Bottle | Fracture Location | Burst Pressure, psig |
| 1 | none | Not determined | 580 |
| 2 | none | Not determined | 520 |
| 3 | none | Not determined | 430 |
| 4 | none | Not determined | 570 |
| 5 | none | Not determined | 460 |
| 6 | none | Not determined | 460 |
| 7 | none | Not determined | 640 |
| 8 | none | Not determined | 430 |
| | | Average | 510 |
| 9 | acrylic[b] | Lower rib ring | 380 |
| 10 | acrylic | Heel or bearing surface | 595 |
| 11 | acrylic | Heel | 620 |
| 12 | acrylic | Heel | 480 |
| 13 | acrylic | Bearing surface | 765 |
| 14 | acrylic | Bearing surface | 648 |
| 15 | acrylic | Bearing surface | 840 |
| 16 | acrylic | Bearing surface | 727 |
| 17 | acrylic | Bearing surface | 538 |
| 18 | acrylic | Believed to be bearing surface | 718 |
| | | Average | 630 |

[a]The control bottles were sampled from the same day of production as were the samples of "pristine" bottles for lab experiments. These "control" bottles received hot end organic tin compound coating and cold end lubricity spray. The annealing grade was checked for each of several control bottle bases and in each instance a grade of 2 was indicated.
[b]As described in U.S. Pat. No. 4,098,934.

TABLE 6

| STRENGTHS OF STYLE 198 32 OUNCE BOTTLES SAMPLED IN THE "PRISTINE" AS-FORMED CONDITION FROM PRODUCTION AND SUBJECTED TO FLUID BED TREATMENTS | | | | | | | |
|---|---|---|---|---|---|---|---|
| Table Entry Line No. | Fluid Bed Treatment[a] | | | Posttreatment Plastic Containment Coating | Strain Grade of the Bottle Base | Fraction Location | Burst psig |
| | Fluidized Media | Temp., F. | Treatment Time, min. | | | | |
| 1 | $Al_2O_3$ | 985 | 15 | acrylic[d] | 3½ | Lower sidewall | 495 |
| 2 | $Al_2O_3$ | 985 | 15 | acrylic | 3½ | Lower sidewall | 655 |
| 3 | $Al_2O_3$ | 985 | 15 | acrylic | 3½ | Central part of base | 550 |
| 6 | $Al_2O_3$ | 985 | 15 | acrylic | 3+ | Bearing surface | 765 |
| 7 | $Al_2O_3$ | 985 | 15 | acrylic | 3+ | Central part of base | 335 |
| 8 | $Al_2O_3$ | 985 | 15 | arcylic | 3 | Central part of base | 715 |
| 9 | $Al_2O_3$ | 985 | 15 | acrylic | 3+ | Central part of base | 900 |
| 10 | $Al_2O_3$ | 985 | 15 | arcylic | 3½ | Central part of base | 700 |
| | | | | | | Average | 650 |
| 11 | $(0.7K_2SiO_3\text{-}0.3Al_2O_3)$[b] | 965 | 15 | acrylic | 5 | Central part of base | 715 |
| 12 | $(0.7K_2SiO_3\text{-}0.3Al_2O_3)$ | 965 | 15 | acrylic | 5 | Bearing surface | 750 |
| 13 | $(0.7K_2SiO_3\text{-}0.3Al_2O_3)$ | 965 | 15 | acrylic | 4½ | Lower Sidewall | 570 |
| 14 | $(0.7K_2SiO_3\text{-}0.3Al_2O_3)$ | 965 | 15 | acrylic | 5 | Central part of base | 810 |
| 15 | $(0.7K_2SiO_3\text{-}0.3Al_2O_3)$ | 965 | 15 | acrylic | 5 | Central part of base | 935 |

TABLE 6-continued

STRENGTHS OF STYLE 198 32 OUNCE BOTTLES SAMPLED IN THE "PRISTINE" AS-FORMED CONDITION FROM PRODUCTION AND SUBJECTED TO FLUID BED TREATMENTS

| Table Entry Line No. | Fluid Bed Treatment[a] Fluidized Media | Temp., F. | Treatment Time, min. | Posttreatment Plastic Containment Coating | Strain Grade of the Bottle Base | Fraction Location | Burst psig |
|---|---|---|---|---|---|---|---|
| | | | | | | Average | 755 |
| 16 | (0.6K₂SiO₃-0.4Al₂O₃)[c] | 975 | 15 | acrylic | 5+ | Not broken (saved for impact) | 970 |
| 17 | (0.6K₂SiO₃-0.4Al₂O₃) | 975 | 15 | acrylic | 4+ | Midsidewall | 730 |
| 18 | (0.6K₂SiO₃-0.4Al₂O₃) | 975 | 15 | acrylic | 4 | Central part of base | 955 |
| 19 | (0.6K₂SiO₃-0.4Al₂O₃) | 975 | 15 | acrylic | 4+ | Near bearing surface | 840 |
| | | | | | | Average | 875 |

[a]Following treatment, bottles were hung in an insulated cylinder to cool to room temperature then they were plastic coated.
[b]A mixed fluid bed of (−50 mesh +100 mesh K₂SiO₃, Stauffer Chemical Company's technical grade ground in laboratory) and nominally 150 mesh Al₂O₃. The mixture was about 70 volume percent potassium silicate.
[c]The fluid bed Al₂O₃ content was increased to −40 volume percent for the 975-985 F. samples.
[d]As described in U.S. Pat. No. 4,098,934.

Table 7 summarizes and compares the data for control bottles which received no fluidized bed treatment, aluminum oxide fluidized bed annealed control bottles, and ion exchange fluidized bed strengthened bottles. strength of each bottle series may be compared with the regular untreated production bottles which exhibited an average burst pressure of 510 psig. Using this control base, the addition of the plastic containment coating to

TABLE 7

SUMMARY COMPARISON OF AVERAGE BURST STRENGTHS OF "CONTROL" AND FLUID BED TREATED "PRISTINE" BOTTLES

| Table Entry Line No. | Fluid Bed Treatment Fluidized Media | Temp., F. | Treatment Time, min. | Purpose of the Bottle Test Group | Approximate Annealing Grade of the Bottle Bases of the Test Group | Average Burst psig | % Higher Burst Pressure vs Uncoated 510 psig "Control" | % Higher Burst Pressure vs Plastic Coated 630 psig "Control" | % Higher Burst Pressure vs Al₂O₃ Annealed 650 psig Bottles |
|---|---|---|---|---|---|---|---|---|---|
| Table 5 Entry No.s 1-8 | — | none | — | Provide "control" data from standard Style 198 production bottles without plastic coating | 2 | 510 | — | — | — |
| Table 5 Entry No.s 9-18 | — | none | — | Provide "control" data from standard Style 198 production bottles with plastic coating | 2 | 630 | 24 | — | — |
| Table 6 Entry No.s 1-10 | 150 mesh Al₂O₃ | 985 | 15 | Determine the annealing grade and strength of "pristine" bottles following treatment in chemically inert fluidized media for 15 min. at 985 F. | 3+ | 650 | 27 | 3 | — |
| Table 6 Entry No.s 11-15 | (0.7K₂SiO₃-0.3Al₂O₃) | 965 | 15 | Determine the annealing grade and strength of "pristine" bottles treated in this ion-exchange media | 5 | 755 | 48 | 20 | 16 |
| Table 6 Entry No.s 16-19 | (0.6K₂SiO₃-0.3Al₂O₃) | 975 | 15 | Determine the annealing grade and strength of "pristine" bottles treated in this ion-exchange media | 4+ | 875 | 72 | 39 | 35 |

From the annealing information set forth in Table 7, it can be seen that the control bottles which were annealed in a production lehr had average annealing grades of 2 while bottles annealed in the laboratory in inert fluidized aluminum oxide at 985° F. for 15 minutes exhibited annealing grades of slightly more than 3. However, those bottles which were simultaneously annealed and strengthened in fluidized potassium silicate and aluminum oxide at 975° F. for 15 minutes exhibited an average annealing grade of 4+. Because an annealing grade of 3 to 4 is considered generally acceptable for production bottles, the treatment of bottles in a fluidized potassium silicate exchange media at such conditions provides annealing which is acceptable for commercial purposes.

From the burst strength information set forth in Table 7, three different control baselines can be observed for assessing strength increases. First, the the production bottles increased the burst strength to 630 psig, an improvement of about 24%. The bottles which were annealed in fluidized aluminum oxide and provided with the plastic containment coating exhibited an average burst pressure of 650 psig, or 27% greater than the uncoated production control samples. Also, the bottles annealed in fluidized aluminum oxide and provided with the containment coating exhibited a burst strength within 3% of that of the plastic coated unannealed production bottles. However, those bottles which were treated in fluidized exchange powder at 965° F. had an average burst strength of 755 psig or 48% higher than the untreated production bottles, 20% greater than the plastic containment coated production bottles, and 16% higher than the bottles which were annealed in fluidized aluminum oxide and coated with the plastic containment coating. Finally, bottles treated in the fluidized exchange media at approximately 975° F. had average burst strengths of 875 psig which is 72% higher than the regular production bottles, 39% higher than the containment coated production bottles and 35% higher than the bottles which were both annealed in fludidized aluminum oxide and provided with a plastic containment coating.

Figure 3:
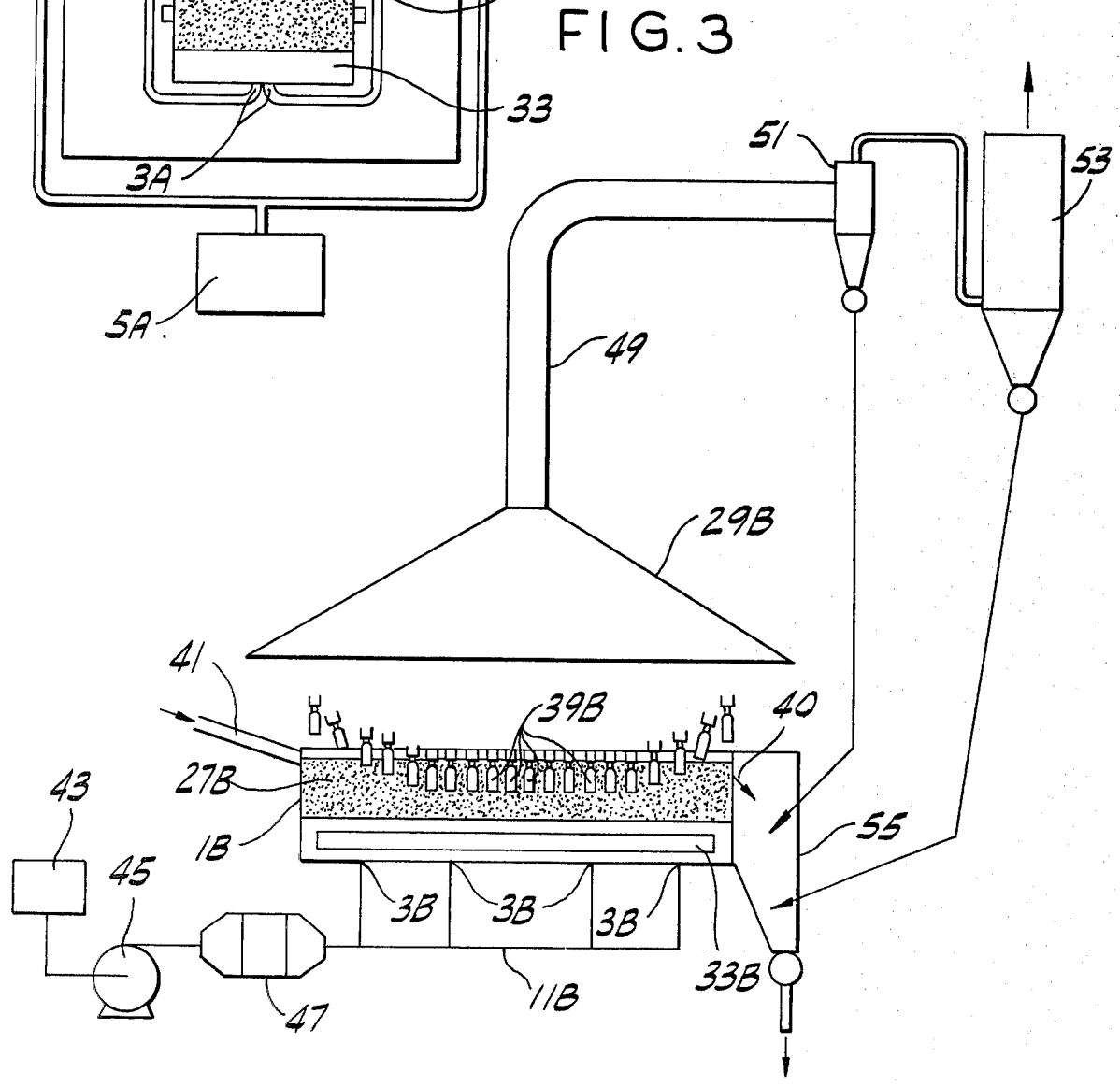
FIG. 3 is a schematic drawing of an apparatus adapted for industrial practice of continuous fluidized bed chemical strengthening of glass bottles.

The process of the invention is suitably adapted for implementation in a continuous operation for the treatment of glass bottles or other glass objects. Such a continuous process may be carried out in the apparatus of FIG. 3 where strengthening is carried out in reaction vessel 1B through which beverage bottles 39B are continuously transported in a substantially horizontal direction from right to left on an overhead mechanical conveying apparatus (not shown). Contained within reaction vessel 1B is a bed 27B which moves continously in a horizontal direction substantially countercurrent to that of the bottles. Thus spent solids in the bed are continuously discharged at a bed overflow 40 while the bed is continuously replenished with fresh chemical strengthening agent introduced at a powder inlet 41. Inlet 41 is located slightly higher than overflow 40, and a fluid head differential sufficient to cause net flow of the bed horizontally from the powder inlet to the overflow is thereby provided.

Fluidizing air is admitted into vessel 1B through gas inlets 3B which are located so as to distribute incoming air evenly to all sections of the bottom of vesel 1B. Between inlets 3B and bed 27B is a distributor plate 33B which provides substantially uniform vertical gas velocity throughout the bed. Air used for fluidization is received at an intake filter 43 and delivered by blower 45 through an air heater 47 and a supply pipe 11B to inlets 3B. Air and fines leaving bed 27B are collected in a dust collection hood 29B and passed through an air discharge pipe 49 to a solids recovery cyclone 51. Overheads from cyclone 51 are discharged to the atmosphere through a bag house 53. Underflow from both cyclone 51 and bag house 53 is delivered to a powder discharge hopper 55 which also receives powder discharged from bed 27B at overflow 40.

Figure 4:
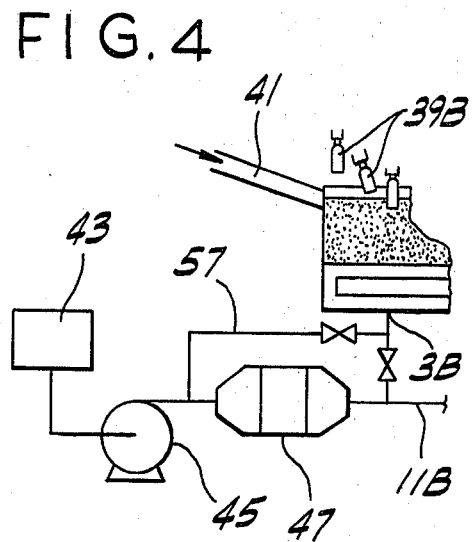
FIG. 4 is a partial schematic drawing showing a preferred embodiment of the apparatus of FIG. 3.

In a preferred embodiment of the invention illustrated in FIG. 4, a bypass 57 is provided whereby air from blower 45 is introduced directly into bed 27B and serves as a fluidizing gas in that portion of the bed adjacent powder inlet 41. Because air passing into the bed through the by-pass is not heated, a cooling subzone is provided within the bed wherein the bottles can be cooled at a rapid rate so as to minimize relaxation of the compressively stressed stratum near the surface of each treated bottle, and whereby the bottles are lowered to a temperature suitable for packaging and/or further processing without the significant delay required for static air cooling.

Other subzones may be defined where conditions are maintained independently of the conditions elsewhere in the bed. For example, if immersion heaters are used, special air inlet and distribution means may be provided for the subzones containing the heaters so as to provide more intense fluidization in such subzones and thereby minimize adherence of fluidized material to the heating surface.

As bottles 39B are removed from bed 27B, any lightly adhering dust is readily removed by impingement of an air stream or jet on the surfaces of the bottles. Thus, the process of the invention entirely avoids the bottle washing step which is required in essentially all prior art chemical strengthening processes for removal of residual strengthening agents and/or products of reaction. The kinetic contact afforded by the use of a fluidized bed not only provides adequate contact for effective strengthening but further provides a scouring action to remove the products of reaction from the bottle surface.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in an limiting sense.

What is claimed is:

1. A process for strengthening a glass object by chemical reaction at the glass surface of said object between the glass and a chemical strengthening agent reactive with the glass to alter its composition and thereby either directly generate compressive stress therein or reduce the thermal expansion coefficient thereof, comprising the steps of:

kinetically contacting said object with a chemical strengthening agent in a bed comprising gas-fluidized particulate solid material under conditions of temperature and active fluidization such that said reaction proceeds but the formation of either stress-concentrating surface defects or an adherent coating of said solid material on the surface of said object is substantially avoided, said solid particulate material comprising an ionic glass material containing cations whose ionic diameters are different from the ionic diameters of cations of the glass of which said object is constituted and said reaction comprising exchange of cations of the ionic glass material for the cations of the constituent glass of the object;

maintaining said object in said bed for a time sufficient for the reaction to alter the composition of a marginal stratum of said object adjacent said surface;

and cooling said object, thereby producing an object of increased strength and toughness having said marginal stratum under compressive stress.

2. A process as set forth in claim 1 wherein ion exchange is conducted at a temperature between about the strain point of the glass and 100° F. above the annealing point thereof.

3. A process as set forth in claim 2 wherein the constituent glass of the object is a soda/lime glass and the ion exchange reaction is conducted at a temperature between about 950 and about 1,000° F.

4. A process as set forth in claim 1 wherein a region of said glass object apart from said stratum is annealed simultaneously with the exchange of the cations of said ionic material for the cations of the constituent glass of the object by bringing the temperature of said glass object to a temperature in excess of the strain point of said constituent glass for a time sufficient to effect annealing in said region.

5. A process as set forth in claim 4 wherein said object is cooled at a rate of at least about 10° to 13° F. per minute.

6. A process as set forth in claim 1 wherein the glass object comprises sodium containing glass and said ionic material comprises potassium silicate.

7. A process as set forth in claim 1 wherein said solid particulate material progresses continuously through a vessel containing said bed in a direction countercurrent to the movement of said glass object.

8. A process as set forth in claim 7 wherein the movement of said object and said solid particulate material are each in a substantially horizontal direction.

9. A process as set forth in claim 7 wherein said object is cooled in a zone of fluidized particulate material outside of the reaction zone.

10. A process as set forth in claim 1 wherein said solid particulate material further includes an agent reactive with the constituent glass of the object to raise the annealing point thereof in a marginal stratum adjacent the glass surface of the object thereby minimizing relaxation of the compressively stressed stratum during exposure to elevated temperatures prior to completion of the cooling step.

11. A process as set forth in claim 1 wherein said bed includes a high melting point diluent for reducing the tendency of the solid particulate material to agglomerate at hot spots.

12. A process as set forth in claim 11 wherein said diluent comprises aluminum oxide.

13. A process for strengthening a silicate glass object by a nitriding reaction at the glass surface of said object between the glass and a chemical strengthening agent effective for nitriding the glass to alter its composition and thereby either directly generate compressive stress therein or reduce the thermal expansion coefficient thereof, comprising the steps of:

kinetically contacting said object with a chemical strengthening agent in a bed comprising gas-fluidized particulate solid material under conditions of temperature and active fluidization such that said reaction proceeds but the formation of either stress-concentrating surface defects or an adherent coating of said solid material on the surface of said object is substantially avoided, said solid particulate material comprising boron nitride which serves as a nitriding agent for reaction with said glass object;

maintaining said object in said bed for a time sufficient for the reaction to alter the composition of a marginal stratum of said object adjacent said surface;

and cooling said object, thereby producing an object of increased strength and toughness having said marginal stratum under compressive stress.

14. A process as set forth in claim 13 wherein boron nitride is reacted with the glass at a temperature between about the strain point of the glass and 100° F. above the annealing point thereof.

* * * * *